US008271197B2

(12) United States Patent
Fogarty et al.

(10) Patent No.: US 8,271,197 B2
(45) Date of Patent: Sep. 18, 2012

(54) PORTABLE ENVIRONMENTAL MONITORING INSTRUMENT

(75) Inventors: Alison Fogarty, St. Kilda (AU); Colin Howard, Hawthorn (AU); Jon Seddon, Surrey Hills (AU); Mark Patterson, Point Cook (AU); Peter Sanders, Keilor (AU); Warren Roberts, Wallan (AU)

(73) Assignee: The Commonwealth of Australia Department of Defence, Canberra Act (AU)

( * ) Notice: Subject to any disclaimer, the term of this patent is extended or adjusted under 35 U.S.C. 154(b) by 279 days.

(21) Appl. No.: 12/474,743

(22) Filed: May 29, 2009

(65) Prior Publication Data
US 2010/0305859 A1 Dec. 2, 2010

(51) Int. Cl.
*G01K 3/00* (2006.01)
(52) U.S. Cl. .......................................... 702/2; 374/109
(58) Field of Classification Search .................. 702/189, 702/2, 130; 374/109
See application file for complete search history.

(56) References Cited

U.S. PATENT DOCUMENTS

| 3,886,797 | A  | * | 6/1975 | Bauer ........................ 73/335.05 |
| 2004/0025865 | A1 | * | 2/2004 | Nichols et al. ........... 128/200.14 |
| 2008/0074254 | A1 | * | 3/2008 | Townsend et al. ....... 340/539.11 |
| 2009/0024361 | A1 | * | 1/2009 | Ransch et al. ................ 702/189 |

* cited by examiner

Primary Examiner — Michael Nghiem
Assistant Examiner — Manuel Rivera Vargas
(74) Attorney, Agent, or Firm — Rothwell, Figg, Ernst & Manbeck, P.C.

(57) ABSTRACT

A portable environmental monitoring instrument comprising: a housing comprising a main body and a cap; a display mounted to the housing; a processing circuit disposed within the main body, the processing circuit electrically connected to the display; a light sensor mounted to the housing and electrically connected to the processing circuit; a humidity sensor electrically connected to the processing circuit; and a probe member extending from the main body and exposed to the environment by opening the cap, the probe member carrying a temperature sensor at a distal end thereof and part of an electrical connection between the temperature sensor and the processing circuit, the processing circuit arranged to process signals received from the light sensor, the humidity sensor and the temperature sensor to obtain an environmental measure indicative of the affect of the environment and control the display to display data indicative of the environmental measure.

19 Claims, 4 Drawing Sheets

PORTABLE ENVIRONMENTAL MONITORING INSTRUMENT

FIELD

The invention relates to a portable environmental monitoring instrument for generating an environmental measure.

BACKGROUND

Environmental conditions can have a significant affect on the ability of people to carry out activities and/or the length of time they can carry out an activity without becoming fatigued or risking physical damage. For example, a person may be able to perform optimally for two hours in moderate environmental conditions but only for 30 minutes in extreme environmental conditions. To this end, it is known to use large, tripod mounted environmental monitoring equipment to monitor the environment. One problem with such equipment is that it is cumbersome and as such not suited to being carried around from place to place. As a result, it may not be possible to monitor a particular operating environment or it may be necessary to rely on monitoring conducted at a location remote from the actual operating environment.

SUMMARY OF THE INVENTION

In a first aspect, the invention provides a portable environmental monitoring instrument comprising:
  a housing comprising a main body and a cap;
  a display mounted to the housing;
  a processing circuit disposed within the main body, the processing circuit electrically connected to the display;
  a light sensor mounted to the housing and electrically connected to the processing circuit;
  a humidity sensor electrically connected to the processing circuit; and
  a probe member extending from the main body and exposed to the environment by opening the cap, the probe member carrying a temperature sensor at a distal end thereof and part of an electrical connection between the temperature sensor and the processing circuit,
  the processing circuit arranged to process signals received from the light sensor, the humidity sensor and the temperature sensor to obtain an environmental measure indicative of the affect of the environment and control the display to display data indicative of the environmental measure.

In an embodiment a portable environmental monitoring instrument further comprises a cap sensor for sensing when the cap is open, the sensor electrically connected to the processing circuit and the processing circuit arranged to only display data indicative of the environmental measure when the cap sensor indicates that the cap is open.

In an embodiment the cap sensor comprises a Hall Effect sensor mounted on the probe member.

In an embodiment the processing circuit is arranged to only display data indicative of the environmental measure based on a data received from the temperature sensor after the cap has been opened for a defined period.

In an embodiment the defined period is related to the time for the temperature sensor to reach an acceptable equilibrium with the environment.

In an embodiment the humidity sensor is a relative humidity sensor.

In an embodiment the humidity sensor is mounted at the distal end of the probe member.

In an embodiment the portable environmental monitoring instrument comprises at least one shield member extending from the main body in the region of the probe member to protect the probe member when the cap is removed.

In an embodiment each shield member comprises a cage member having openings therethrough to allow air flow around the temperature sensor.

In an embodiment the temperature sensor is mounted on the probe member at a displacement relative to the main body sufficient to respond to a 5 degree Celsius temperature change within one minute.

In an embodiment the temperature sensor is mounted on the probe member at a displacement of 30 to 50 mm from the main body.

In an embodiment the temperature sensor is mounted on the probe member at a displacement of 35 to 45 mm from the main body.

In an embodiment the temperature sensor is mounted on the probe member at a displacement of 36 to 50 mm from the main body.

In an embodiment the probe member extends from a first end of the main body and the light sensor is mounted to a second opposed end of the main body.

In an embodiment the main body is sized so as to be adapted to be grasped by a user's hand between the first and second ends.

In an embodiment the main body is elongate.

In an embodiment the probe member is a replaceable probe unit comprising an electrical connector at a proximal end for electrical connection of the probe member to the processing circuit.

In an embodiment the displayed data includes the environmental measure.

In an embodiment the environmental measure is indicative of the affect of the environment on a mammal.

In a second aspect, the invention provides, a replaceable probe unit for a portable environmental monitoring instrument, comprising:
  an electrical connector for electrical connection of the replaceable probe unit to a processing circuit of the environmental monitoring instrument; and
  a probe member carrying a temperature sensor at a distal end thereof and an electrical connection between the temperature sensor and the electrical connector.

In an embodiment a replaceable probe unit comprises a humidity sensor mounted at the distal end of the probe member.

DETAILED DESCRIPTION

The drawings illustrate a portable environmental monitoring instrument 30. The environmental monitoring instrument takes measures of temperature, humidity and solar radiation and uses these to produce a measure indicative of the affect of the environment on mammals such as humans. In the embodiment, the measure which is produced and displayed on display 19 is of the environmental stress index which employs a formula taking into account humidity, temperature and solar radiance to produce an environmental measure presented in the form of a value. However, a person skilled in the art will appreciate that the data can be presented in a number of ways, for example a colour code could be used to indicate the affect of the environment rather than a numerical scale. A numerical scale may require further interpretation for example based on the nature of the activity. Therefore, although not shown, it is possible that the output on the display 19 could take into account the activity that the person is engaged in or display safe levels for various different activities in order to provide context for the measure which is displayed.

Figure 1:
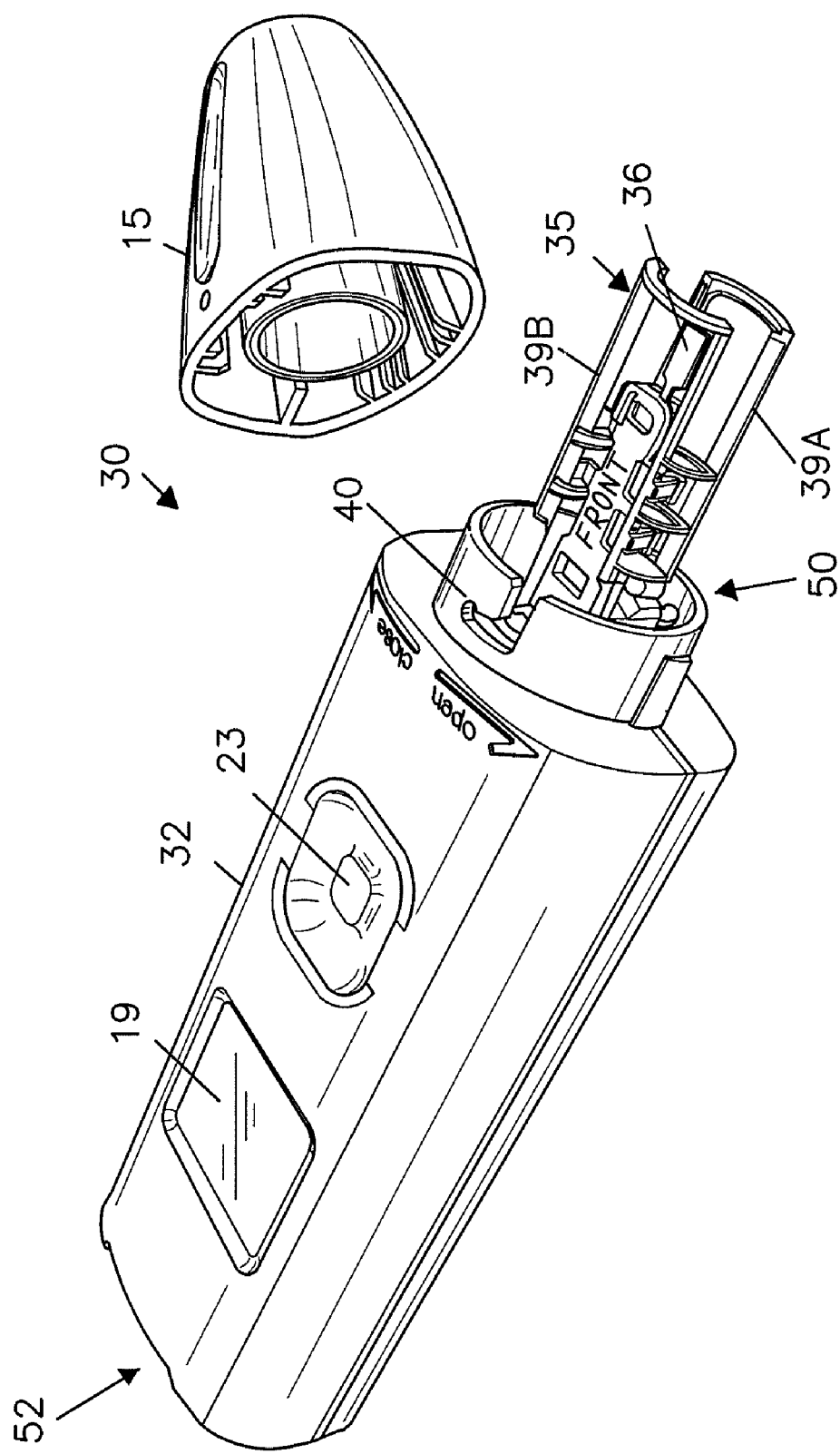
FIG. 1 is a perspective view of the environmental monitoring instrument of an embodiment of the invention.

Referring to FIG. 1, the portable environmental monitoring instrument 30 has a main body 32 and a cap 15 which attaches to the main body by a bayonet attachment which fits into bayonet slot 40.

A probe member 35 extends from a first end 50 of the main body 32. The probe member 35 has a temperature and humidity sensor 36 mounted at a distal end of a circuit board which is sandwiched between a pair of cage members 39 which act to shield the humidity and temperature sensor 36 to prevent it from being damaged inadvertently. The circuit board 11 of probe member 35 is attached (through to the cap seal 17) to the main circuit board 10. The portable environmental monitoring instrument 30 is designed to be of a size that it can be readily placed in luggage, such as in a backpack, or otherwise carried on the person of a user. It is sized so that it can be grasped between the two ends 50 and 52 in the hand of a user who operates the device by pressing the switch 23. The design of the probe member 35, in particular the manner in which it extends from the main body 32 and that a thin circuit board that is used to mount the chip comprising the humidity and temperature sensor 36, advantageously allows the sensor to respond to a temperature change of at least 5° Celsius in a minute. In this embodiment the sensor 36 is mounted 38 mm from the body. However, the actual mounting position will vary depending on the embodiment and mounting distances of 30 mm to 50 mm, more preferably 35 mm to 45 mm or 36 to 50 mm will suit some embodiments.

The inventors have realised in designing the portable instrument 30, a significant problem is that the casing of any such small device carries has significant amount of thermal mass which means that once the instrument 30 is at a particular temperature, for example inside a user's backpack, it can take a significant amount of time to adjust to the environment. This has the potential to seriously affect the accuracy of readings obtained with the instrument 30. Accordingly, mounting the sensor 36 on the distal end of the probe member 35 allows the probe to reach the environmental temperature within an acceptable time frame as it is separated from the main body 32 and mounted on a circuit board that does not conduct much heat from the main body such that it can cool more rapidly than the main body. In this respect it is noted that the cage members 39A, 39B which protect the humidity and temperature sensor 36 and the board 11 on which it is mounted 17 have apertures to allow airflow around the sensor 36.

In this respect, in operation, the user can move the instrument 30 from side to side to cause air to flow over the sensor 36 to cause it to reach the environmental temperature more quickly. In this embodiment, the temperature sensor and humidity sensor are provided in a single unit and the device which is selected to be used is an SHT7x humidity and temperature sensor available from Sensirion of Zurich Switzerland.

The light sensor, which is an infrared sensor is used to obtain a measure of radiation is disposed at the second end 52. The light sensor is a TSL 245R infrared light frequency converter available from Texas Advanced Optoelectronic Solution. This device incorporates a photodiode 12A mounted near window 12B and a current frequency converter which outputs a signal which is processed by the main circuit 10 to obtain a measure of solar radiance. The main circuit 10 is calibrated to produce an accurate solar radiance measure.

Figure 2:
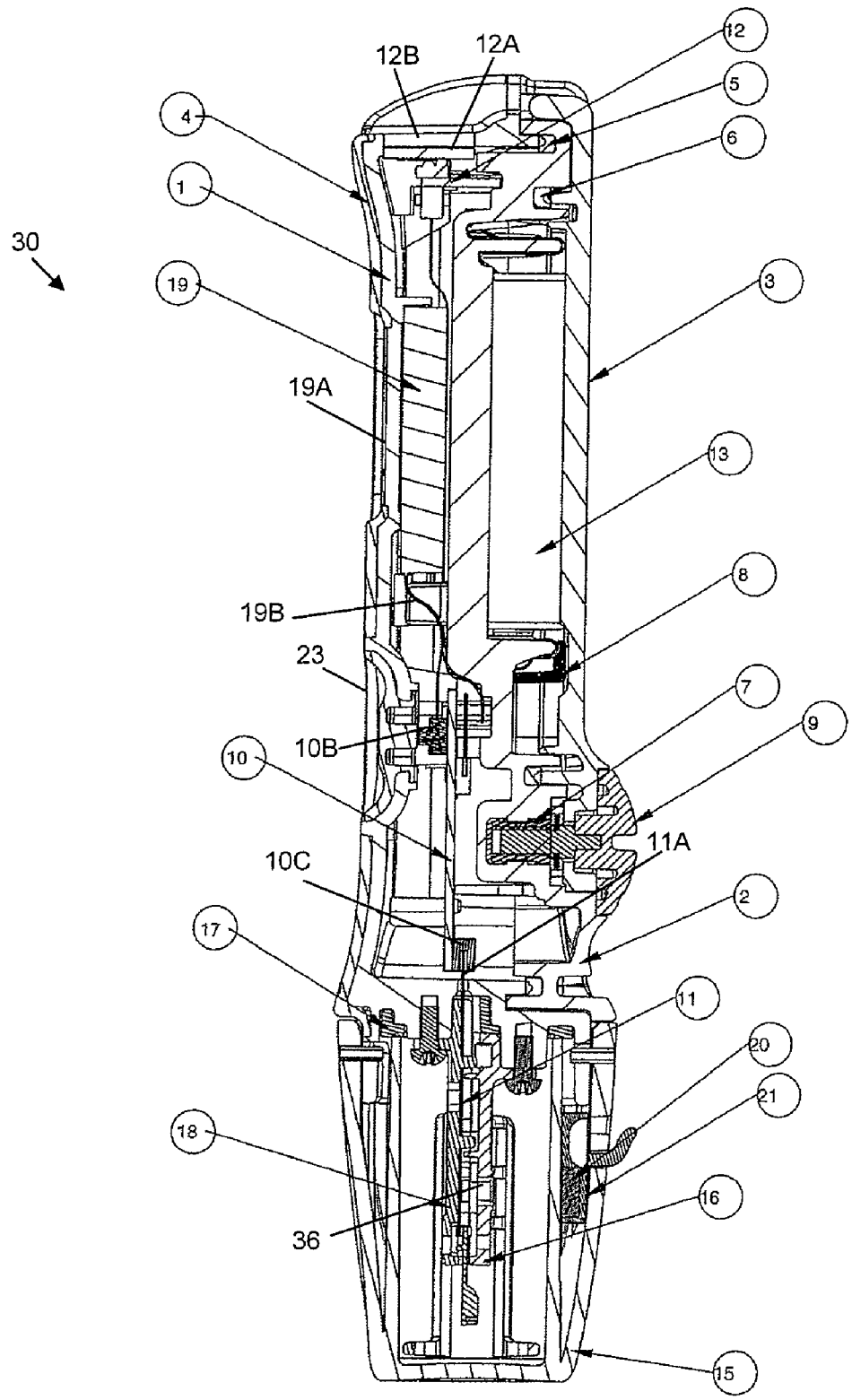
FIG. 2 is a sectional view of the monitoring instrument.
Figure 3:
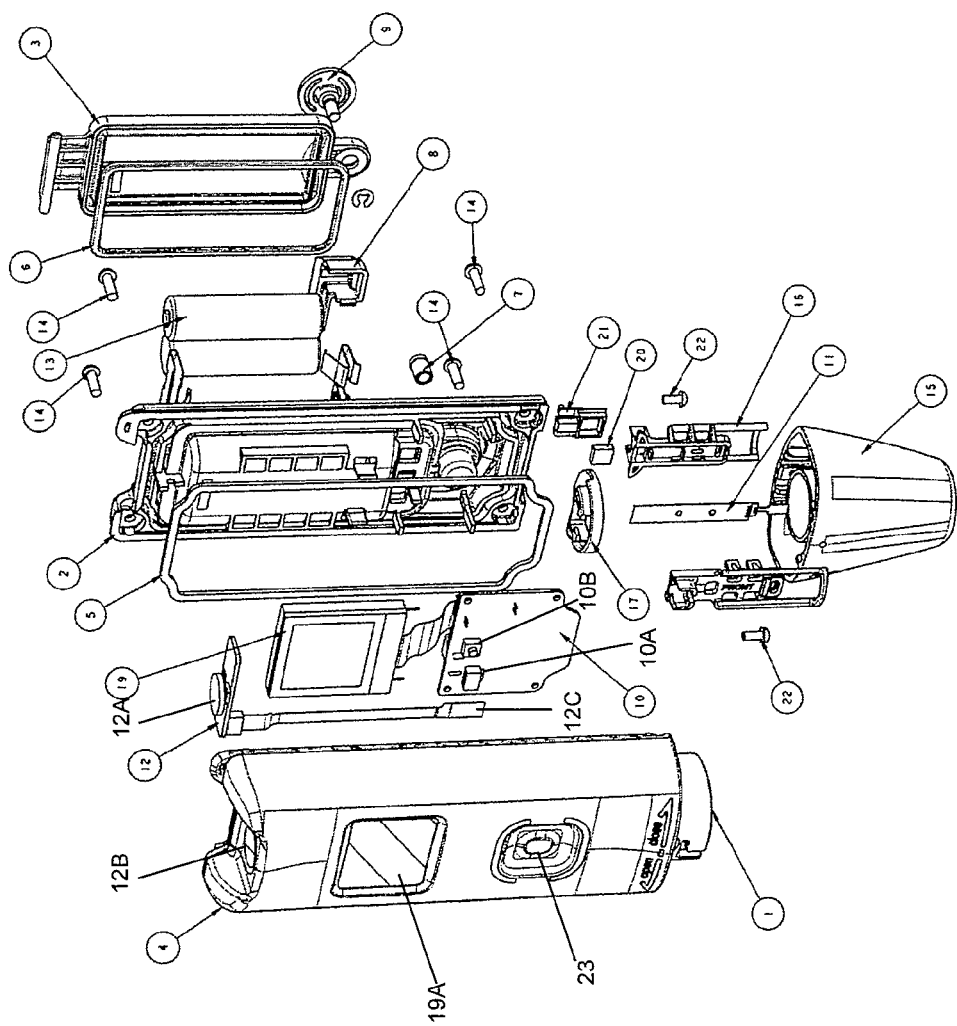
FIG. 3 is an exploded view of the monitoring instrument.

Referring now to FIGS. 2 and 3, the main body 32 is formed from a front housing 1 and a rear housing 2. The front and rear housing portions are joined by screws 14 and have between them a housing seal 5. A battery flap 3 is mounted to the rear housing by the battery flap screw 9 and holds a pair of batteries 13 which are mounted by contacts 8 to the main circuit board 10 which provides a processing circuit for the environmental monitoring instrument 30. The screw 9 of the battery flap 9 is received within the insert 7. A seal 6 surrounds the battery compartment.

The main circuit board 10 is connected to a display 19 and to an infrared assembly 12 which has an infrared light sensor 12A and a connector 12C which fits into connector 10A on the circuit board 10. The main circuit board 10 has a button 10B which is operated by pressing switch 23. The display 19 is viewable through a window 19A in the front housing 1 of the main body 32. The display 19 is an LCD backlit display. A support arm members 16 carries the probe circuit board 11 and is covered by cover member 18. The support arm member 16 and cover member 18 carry the cage members 39 which are formed integrally with the support arm member 16 and the cover member 18 respectively. A seal 17 closes the first end 50 of the is main body 32 and the support arm 16 and cover member 18 are attached by screws 22 which extend through the seal 17 into mounts in the main body.

The probe circuit board 11 carries electrical connections for the temperature and humidity sensor and has an electrically connector 11A at a proximal end which is connected to an electrical connector 10C on the main circuit board 10 to provide power to the probe circuit board as well as for data transfer between the probe circuit board 11 and the processor on the main circuit board.

The probe circuit board 11 has a Hall Effect sensor and the cap has a magnet 20 mounted within magnet holder 21. In this manner, it is possible for the main circuit 10 to determine whether the cap has been removed or not. In the embodiment, the main circuit 10 is configured to prevent an environmental measure being taken until the cap has been removed for a defined period of time. The defined period of time can be an arbitrary minimum or can be specifically linked to the estimated time required for the temperature and humidity sensor 36 to reach the surrounding environmental conditions.

Further to features of embodiment include, that the internal current is about 30 mA such that there is low power consumption in the system can run off two 1.5 volt AA batteries. When the device is off the current draw for batteries is less than 50 µA. An LED backlight is used on the LCD display 19 to provide a better reliability. The push button switch 23 is sealed meaning that there is little prospect of water getting into the instrument. The controller mounted on the main circuit 10 as a Texas Instruments, MSP 430 controller.

The housing components 1,2,15 are injection moulded from polycarbonate for toughness and to cope with the impacts which might otherwise damage the device.

Figure 4:
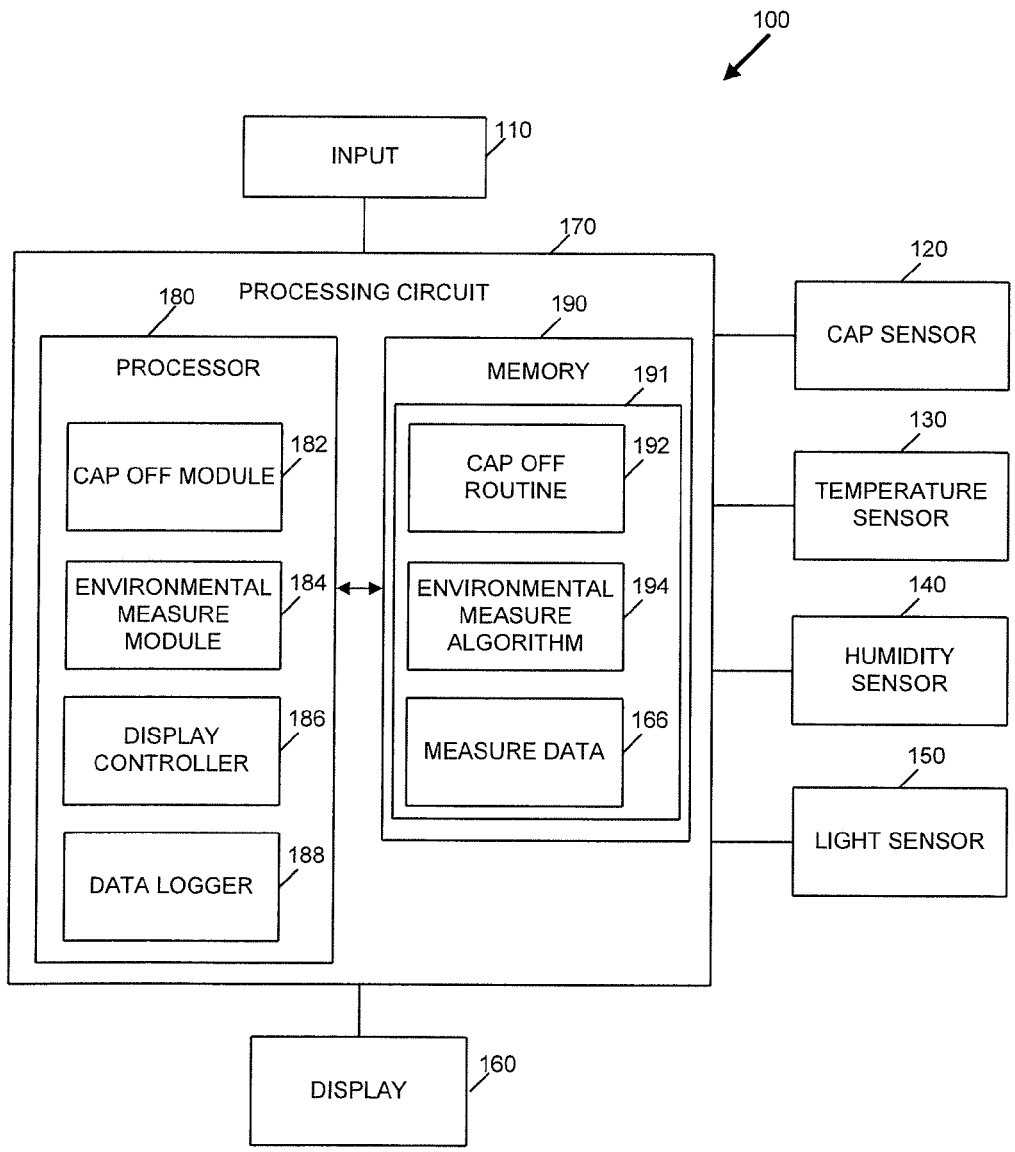
FIG. 4 is a functional block diagram of environmental monitoring instrument.

FIG. 4 is a block diagram 100 which shows the operation of the instrument. The processing circuit 170 operates in response to an input 110, in this case the operation of switch 23 to press button 10B on the main circuit. The processing circuit includes a processor 180 and a memory 190. Memory is loaded with program code 191 which enables the processor 180 to instantiate a number of different modules in order for the device to operate. A person skilled in the art will appreciate that while the memory 190 is shown as separate to the processor 180 in FIG. 4, it is also common for microcontrollers to incorporate sufficient memory internally to store such program code 191.

When the button is pressed, the processor first instantiates a cap off module 182 based on a cap off routine 192. This routine causes the processing circuit 170 to obtain data from the cap sensor 120 (in the above embodiment the Hall Effect sensor) to determine whether the cap has been removed. The cap off module 182, also enforces any timing restrictions on taking the measures. For example, the cap off module 182 may have a predetermined time limit, such as 15 seconds or 1 minute before it will allow a measure to be obtained. The cap off module may provide an error message when this time has not elapsed, thereby requiring the user to wait a certain time until pressing the button. Alternatively the cap off module may cause the processor to wait for a defined time period before the processor 180 will take a measure. The time limit can be set based on an estimate of when the circuit will be ready to take a measure or based on the average time which the temperature sensor 130 requires to equilibrate. In this embodiment, the cap sensor 120 is a Hall Effect sensor which produces a change in signal when the magnet 20 on the cap is displaced by opening the cap. In other embodiments, removing the cap may break or close a circuit. A person skilled in the art will also appreciate that other constructions can be used, for example the cap could be a flip top cap rather than a screw off cap.

When the cap off module allows a measure to be taken, the environmental measure module 184 obtains data from each of the temperature sensor 130, humidity sensor 140 and light sensor 150 and applies environmental measure algorithm 194 to obtain an environmental measure. Display controller 186 then causes the display 160 (here LCD display 19) to display the measure.

A suitable algorithm is:

$$ESI=0.63*Ta-0.03*RH+0.004*SR+0.0054(Ta*RH)-0.073(0.1+SR)$$

where:
Ta=air temperature (° C.)
RH=relative humidity (%) and,
solar radiance (watts·m$^{-2}$).

In some embodiments, a data logger 188 is also provided which stores each measurement that is made in the memory 190 as measured data 196.

Persons skilled in the art will appreciate that a number of variations may be made to the above embodiment and in particular that features described above may be used to form further embodiments falling within the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A portable environmental monitoring instrument comprising:
   a housing comprising a main body and a cap;
   a display mounted to the housing;
   a processing circuit disposed within the main body, the processing circuit electrically connected to the display;
   a light sensor mounted to the main body of the housing and electrically connected to the processing circuit;
   a humidity sensor electrically connected to the processing circuit; and
   a probe member extending from the main body and exposed to the environment by opening the cap, the probe member carrying a temperature sensor at a distal end thereof and part of an electrical connection between the temperature sensor and the processing circuit,
   the processing circuit arranged to process signals received from the light sensor, the humidity sensor and the temperature sensor to obtain an environmental measure based on the signals received from each of the light sensor, the humidity sensor and the temperature sensor and indicative of the affect of the environment and control the display to display data indicative of the environmental measure, and
   the temperature sensor is mounted on the probe member at a displacement of 30 to 50 mm from the main body.

2. A portable environmental monitoring instrument as claimed in claim 1, comprising a cap sensor for sensing when the cap is open, the sensor electrically connected to the processing circuit and the processing circuit arranged to display data indicative of the environmental measure only when the cap sensor indicates that the cap is open.

3. A portable environmental monitoring instrument as claimed in claim 2, wherein the cap sensor comprises a Hall Effect sensor mounted on the probe member.

4. A portable environmental monitoring instrument as claimed in claim 2, wherein the processing circuit is arranged to display the data indicative of the environmental measure only after the cap has been opened for a defined period.

5. A portable environmental monitoring instrument as claimed in claim 4, wherein the defined period is related to the time for the temperature sensor to reach an acceptable equilibrium with the environment.

6. A portable environmental monitoring instrument as claimed in claim 1, comprising at least one shield member extending from the main body in the region of the probe member and at least partially beyond the distal end of the probe member to protect the probe member when the cap is removed.

7. A portable environmental monitoring instrument as claimed in claim 6, wherein each shield member comprises a cage member having openings therethrough to allow air flow around the temperature sensor.

8. A portable environmental monitoring instrument as claimed in claim 1, wherein the probe member extends from a first end of the main body and the light sensor is mounted to a second opposed end of the main body.

9. A portable environmental monitoring instrument as claimed in claim 8, wherein the main body is sized so as to be adapted to be grasped by a user's hand between the first and second ends.

10. A portable environmental monitoring instrument as claimed in claim 1, wherein the humidity sensor is a relative humidity sensor.

11. A portable environmental monitoring instrument as claimed in claim 1, wherein the humidity sensor is mounted at the distal end of the probe member.

12. A portable environmental monitoring instrument as claimed in claim 1, wherein the temperature sensor is mounted on the probe member at a displacement relative to the main body sufficient to respond to a 5 degree Celsius temperature change within one minute.

13. A portable environmental monitoring instrument as claimed in claim 1, wherein the temperature sensor is mounted on the probe member at a displacement of 35 to 45 mm from the main body.

14. A portable environmental monitoring instrument as claimed in claim 1, wherein the temperature sensor is mounted on the probe member at a displacement of 36 to 50 mm from the main body.

15. A portable environmental monitoring instrument as claimed in claim 1, wherein the main body is elongate.

16. A portable environmental monitoring instrument as claimed in claim 1, wherein the probe member is a replaceable probe unit comprising an electrical connector at a proximal end for electrical connection of the probe member to the processing circuit.

17. A portable environmental monitoring instrument as claimed in claim 1, wherein the displayed data includes the environmental measure.

18. A portable environmental monitoring instrument as claimed in claim 1, wherein the environmental measure is indicative of the affect of the environment on a mammal.

19. A portable environmental monitoring instrument as claimed in claim 1, wherein the environmental measure is an environmental stress index value.

* * * * *